United States Patent [19]
Hori et al.

[11] Patent Number: 5,519,385
[45] Date of Patent: May 21, 1996

[54] CIRCUIT FOR SWITCHING SIGNAL PROCESSING CIRCUITS

[75] Inventors: Tsuguo Hori; Hiroshi Akahori, both of Tokyo, Japan

[73] Assignee: NEC Corporation, Japan

[21] Appl. No.: 249,057

[22] Filed: May 25, 1994

Related U.S. Application Data

[63] Continuation of Ser. No. 905,753, Jun. 29, 1992, abandoned.

[30]  Foreign Application Priority Data

Jun. 29, 1991 [JP] Japan ................................ 3-185223

[51] Int. Cl.$^6$ .................................................. H04M 3/22
[52] U.S. Cl. ............................. 340/825.16; 395/182.01
[58] Field of Search ...................... 340/825.16, 825.01; 371/8.1, 8.2, 11.1, 11.2; 395/182.01, 181

[56] References Cited

U.S. PATENT DOCUMENTS

| | | | |
|---|---|---|---|
| 4,377,861 | 3/1983 | Huffman | 370/112 |
| 4,837,761 | 6/1989 | Isono et al. | 370/60 |
| 5,132,962 | 7/1992 | Hobgood et al. | 371/11.2 |
| 5,202,980 | 4/1993 | Morita et al. | 371/8.1 |

FOREIGN PATENT DOCUMENTS 2-44845  2/1990  Japan ..................................... 371/11.2

OTHER PUBLICATIONS

Karnaugh, M. *International Switching Symposium* 1976 25, "Design Considerations For A Digital Switch", Kyoto, Japan (Oct. 1976), pp. 212-4-1—212-4-6.
Miyazawa, S., et al., *NEC Research and Development*, "Multiprocessing System Provided with Fail-Soft Operation Function", No. 94, Tokyo, Japan (Jul. 1989), pp. 129–135.
Treves, S. R., *Proceedings of the IEEE*, "Maintenance Strategies for PCM Circuit Switching", vol. 65, No. 9, New York, US (Sep. 1977), pp. 1363–1374.

*Primary Examiner*—Michael Horabik
*Attorney, Agent, or Firm*—Ostrolenk, Faber, Gerb & Soffen

[57]  ABSTRACT

Switching circuitry incorporated in a system including a plurality of signal processing circuits having an identical function. The circuitry has a selector and a controller which replace, in response to alarm signals from individual signal processing circuits, the processing timing of a failed signal processing circuit with that of another signal processing circuit which is normal.

4 Claims, 4 Drawing Sheets

Fig. 2A PRIOR ART  TIME SLOT NO.

Fig. 2B PRIOR ART  TIMING SIGNAL 4

Fig. 2C PRIOR ART  SIGNAL PROCESS CCT (BEFORE SWITCHING)

Fig. 2D PRIOR ART  SIGNAL PROCESS CCT (AFTER SWITCHING)

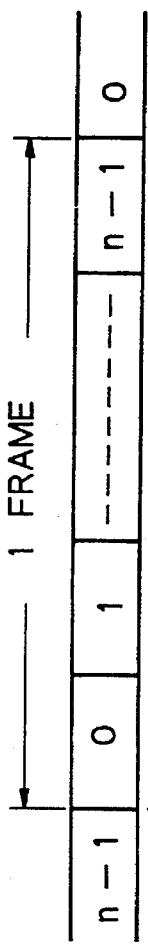
Fig. 4A TIME SLOT NO.
Fig. 4B TIMING SIGNAL 4
Fig. 4C SIGNAL PROCESS C C T (BEFORE SWITCHING)
Fig. 4D SIGNAL PROCESS C C T (AFTER SWITCHING)

1

CIRCUIT FOR SWITCHING SIGNAL PROCESSING CIRCUITS

This is a continutation of application Ser. No. 07/905,753, filed on Jun. 29, 1992, now abandoned.

BACKGROUND OF THE INVENTION

The present invention relates to circuitry incorporated in a system including a plurality of signal processing circuits having an identical function for switching them over.

A system including a plurality of signal processing circuits having an identical function additionally includes a standby signal processing circuit. When any one of the active signal processing circuits fails, it is replaced with the standby signal processing circuit to insure the reliability of the system. However, this kind of system is totally shut down when the standby signal processing circuit substituting for the failed circuit fails itslef. While a number of standby circuits may be incorporated in the system to cope with the above occurrence, such an approach is not desirable from the cost standpoint since standby circuits are simply useless so long as the other circuits are normal.

SUMMARY OF THE INVENTION

It is therefore an object of the present invention to provide circuitry for switching signal processing circuits which insures the reliability of a system against the failure of the signal processing circuits.

It is another object of the present invention to provide a circuit for switching signal processing circuits which guarantees the processing of a time slot of primary importance in the system ascpect even when any of the processing circuits fails.

In accordance with the present invention, circuitry for switching signal processing circuits comprises n signal processing circuits each receiving an input signal having n time division multiplexed signals to thereby output a result of processing as a data signal, a selector for generating a switching signal in response to n alarm signals each being generated by respective one of the n signal processing circuits when associated one of the signal processing circuits fails, and a controller receiving a timing signal representative of a relation between the switching signal and the input signal for switching over timings at which the n signal processing circuits should process the input signal.

Also, in accordance with the present invention, a method of switching n signal processing circuits each receiving an input signal made up of n time division multiplexed signals to thereby produce a result of processing as a data signal comprises the steps of causing each of the n signal processing circuits to generate an alarm signal when failed, generating a switching signal in response to the alarm signal, feeding a timing signal representative of a relation between the switching signal and the input signal, and switching timings for particular ones of the n signal processing circuits to process the input signal.

BRIEF DESCRIPTION OF THE DRAWINGS

The above and other objects, features and advantages of the present invention will become more apparent from the following detailed description taken with the accompanying drawings in which:

FIGS. 4A–4D are timing charts representative of a specific operation of the embodiment.

DESCRIPTION OF THE PREFERRED EMBODIMENT

Figure 1:
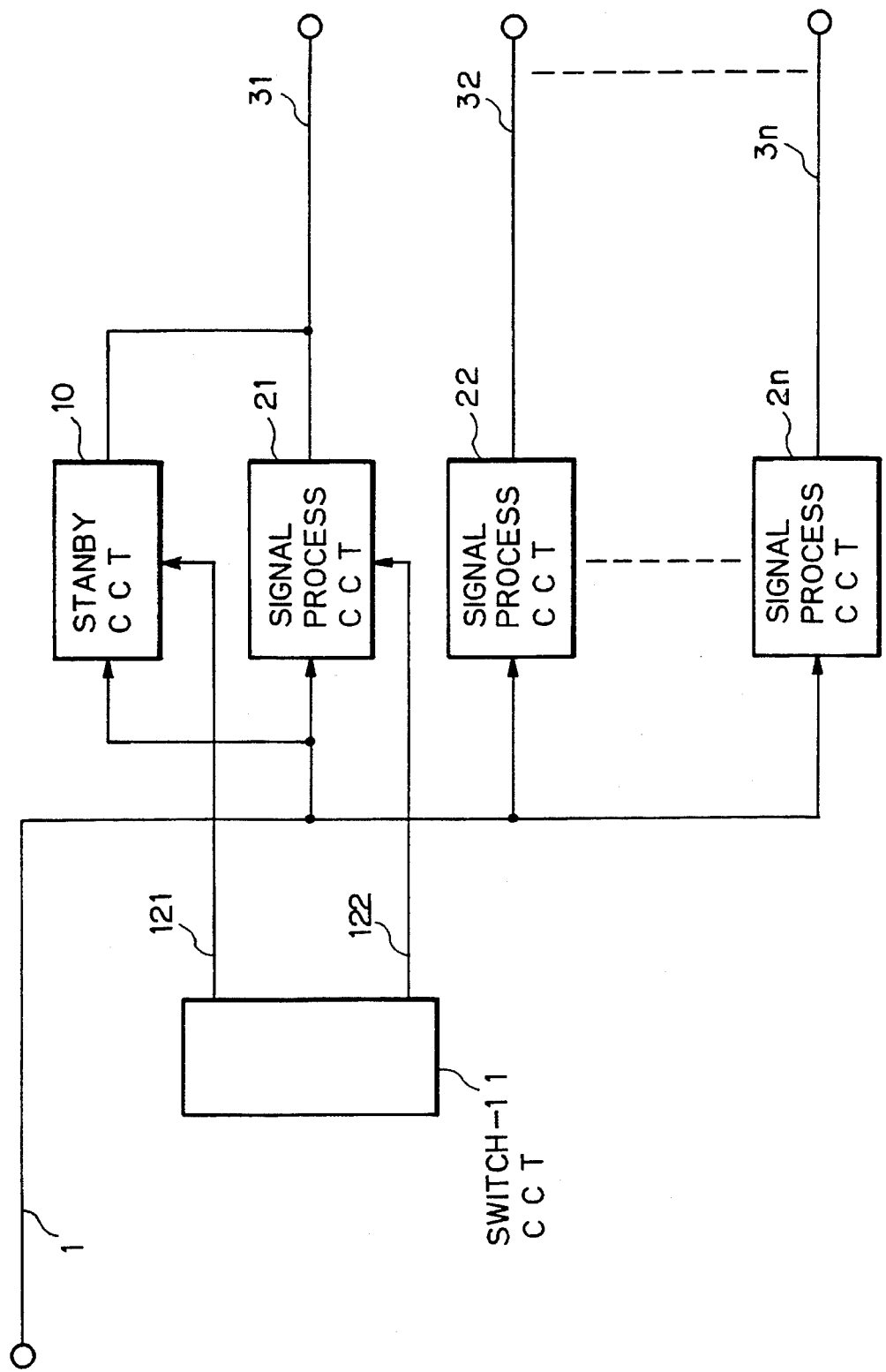
FIG. 1 is a block diagram schematically showing conventional circuitry for switching signal processing circuits.
Figure 2:
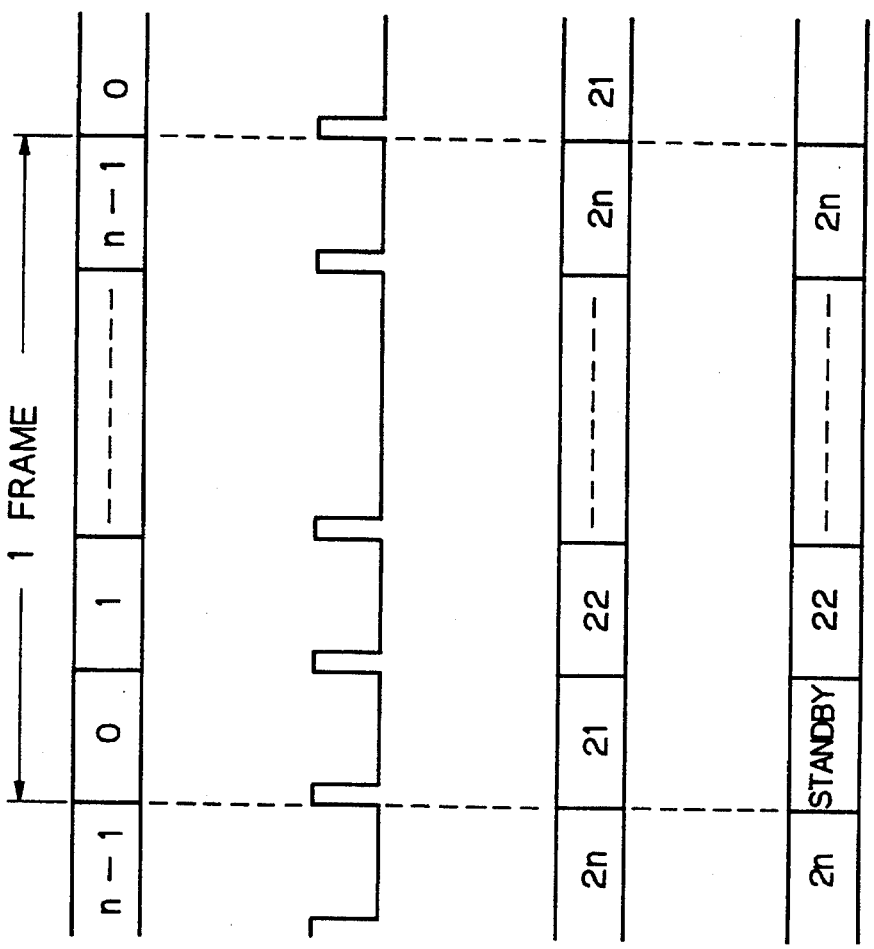
FIGS. 2A–2D are timing charts demonstrating a specific operation of the conventional switching circuitry.

To better understand the present invention, a brief reference will be made to conventional switching circuitry incorporated in a TDMA (Time Division Multiple Access) receiver by way of example, shown in FIG. 1. As shown, the switching circuitry has η signal processing circuits 21–2n, a standby circuit 10, and a switching circuit 11. The n signal processing circuits 21–2n receive an input signal 1 made up of n time division multiplexed signals and produce data signals 31–3n, respectively. The standby circuit 10 is connected in parallel with the signal processing circuits 21 for producing a data signal 31 in response to the input signal 1. The switching circuit 11 selectively switches over the signal processing circuit 21 and standby circuit 10 with control signals 121 and 122. The input signal 1 is made up of n time slots, i.e., a time slot including system information and similar signals of primary importance for the system (referred to as an important time slot hereinafter) and time slots for handling general signals (referred to as general time slots hereinafter). The important time slot is assigned to the signal processing circuit 21 while the general time slots are each assigned to particular ones of the signal processing circuits 22–2n. In response to a timing signal shown in FIG. 2B and included in the input signal 1, the signal processing circuits 21–2n each processes the associated time slot, as shown in FIG. 2C. When the signal processing circuit 21 assigned to the important time slot fails, the switching circuit 11 delivers the control signals 121 and 122 to replace the signal processing circuit 21 with the standby circuit 10. As a result, as shown in FIG. 2D, the standby circuit 10 handles the important time slot afterwards to thereby insure the reliability of the system.

However, the problem with the conventional switching circuitry is that once the standby circuit 10 fails itself, the circuitry cannot deal with the important time slot at all, resulting in total system down. While this problem may be eliminated if a number of standby circuits are used, such an implementation is not desirable from the economy standpoint since the standby circuits are simply useless so long as the signal processing circuit are free from errors.

Figure 3:
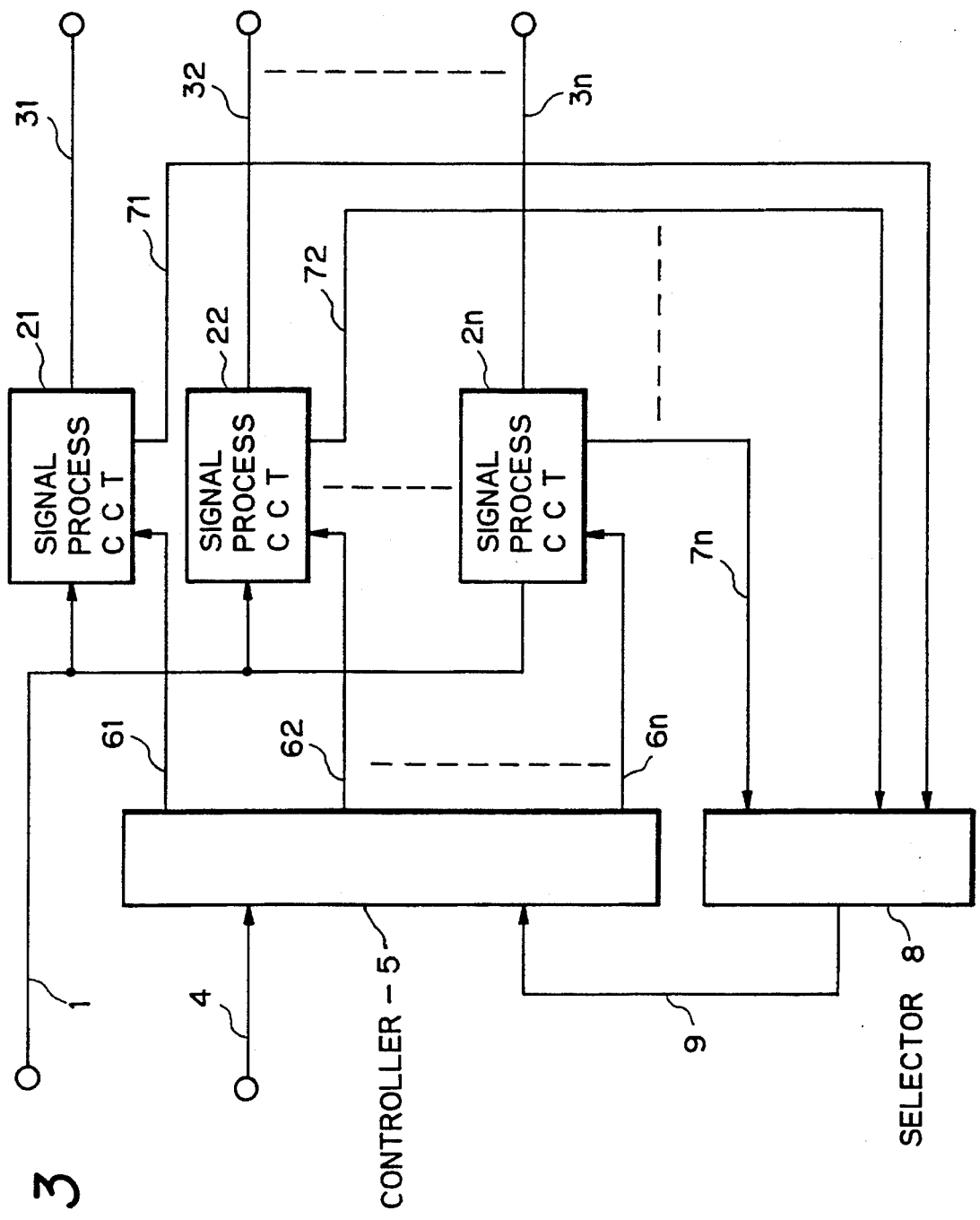
FIG. 3 is a schematic block diagram showing circuiry for switching signal processing circuits embodying the present invention.

Referring to FIG. 3, circuitry for switching signal processing circuits embodying the present invention is shown. As shown, η signal processing circuits 21–2n output respectively data signals 31–3n in response to an input signal 1 having n signals including an important time slot and general time slots multiplexed on a time division basis. A controller 5 is connected to the signal processing circuits 21–2n and receives a timing signal 4 representative of a relation of the multiplexed input signal 1 with respect to time. The controller 5 delivers control signals 61–6n to the signal processing circuits 21–2n, respectively. The signal processing circuits 21–2n deliver respectively alarm signals 71–7n to a selector 8. The selector 8 feeds a switching signal 9 matching the alarm signals 71–7n to the controller 5. The selector 8 constantly determines which of the signal processing circuits 21–2n is handling the important time slot, and it assigns the important time slot to normal one of the signal processing circuits 21–2n prior to the general time slots.

A reference will be made to FIGS. 4A–4D for describing a specific operation of the embodiment. As shown in FIG. 4A, the input signal 1 has an important time slot and general time slots multiplexed on a time division basis. The controller 5 sequentially switches the signal processing circuits 21–2n in response to the timing signal 4 shown in FIG. 4B and corresponding to the input signal 1. Assume that the time slot No. 0 is the important time slot and is handled by the signal processing circuit 21, as shown in FIG. 4C. Then, as the signal processing circuit 21 fails, the circuit 21 sends an alarm signal 71 to the selector 8. In response, the selector 8 determines that the signal processing circuit 21 is handling the important time slot, while determining whether or not the other signal processing circuits are normal. Then, the selector 8 delivers a switching signal 9 to the controller 5 for causing the controller 5 to replace the processing timing of the failed signal processing circuit 21 with that of any one of the normal signal processing circuits. On receiving the switching signal 9, the controller 5 shuts down the signal processing circuit 21 represented by the alarm signal 71. At the same time, the controller 5 replaces the signal processing circuit 21 with one of the other signal processing circuits dealing with the general time slots, e.g., the signal processing circuit 22 by changing the timings for generating the control signals 61 and 62. As a result, the important time slot No. 0 is handed over to the signal processing circuit 22 afterwards.

If the signal processing circuit to handle the important time slot is sequentially replaced in the above-described manner, an occurrence that the processing of the important type slot is practically interrupted due to a failure of a signal processing circuit is almost eliminated. This is successful in preventing the whole system from being disabled.

In summary, it will be seen that the present invention provides switching circuitry including a selector and a controller which replaces, in response to alarm signals from individual signal processing circuits, the processing timing of a failed signal processing circuit with that of another signal processing circuit. Hence, the circuitry guarantees the processing of an important time slot until all the signal processing circuits fail, reducing the system down rate and thereby enhancing the reliability of the system. The circuitry of the invention will be especially desirable when the system is situated at a location too remote to effect immediate maintenance in the event of failure.

Various modifications will become possible for those skilled in the art after receiving the teachings of the present disclosure without departing from the scope thereof.

What is claimed is:

1. Circuitry for switching signal processing circuits, comprising:

n signal processing circuits for respectively receiving an input signal having n time division multiplexed signals occurring in different time slots; one of said time slots being assigned to handle important information, the others of said time slots being assigned to handle less important information; each signal processing circuit processing the input signal in a respective one of the time slots to thereby generate an output signal and each signal processing circuit generating an alarm if such signal processing circuit fails;

a selector for determining which one of said n signal processing circuits is processing information in the time slot assigned to the important information and for generating a switching signal in response to an alarm signal from said one signal processing circuit; and a controller for allocating the n signal processing circuits to respective ones of said time slots and for replacing, in response to the switching signal received from the selector indicating that the signal processing circuit processing to the important information has failed, said failed signal processing circuit with another one of said n signal processing circuits which has not failed, while each of the other of said signal processing circuits which has not failed continues to process said input signal only in the same time slot as it was processing said input signal prior to said replacing so that the input signal is not processed in the time slot which had been assigned to the failed signal processing circuit.

2. A method of switching n signal processing circuits each of which receives an input signal having n time division multiplexed signals occurring in different time slots; one of said time slots being assigned to handle important information, the others of said time slots being assigned to handle less important information; each signal processing circuit processing the input signal in a respective one of the time slots to thereby generate an output signal, said method comprising the steps of:

allocating the n signal processing circuits to respective ones of said time slots;

determining which one of said n signal processing circuits is processing information in the time slot assigned to important information;

if one of said n signal processing circuits fails, causing said failed signal processing circuit to generate an alarm signal;

generating a switching signal in response to an alarm signal from the signal processing circuit processing information in the time slot assigned to processing important information; and replacing, in response to the switching signal indicating that the signal processing circuit processing the important information has failed, said failed signal processing circuit with another one of said n signal processing circuits which has not failed, while each of the other of said signal processing circuits which has not failed continues to process said input signal only in the same time slot as it was processing said input signal prior to said replacing so that the input signal is not processed in the time slot which had been assigned to the failed signal processing circuit.

3. A method according to claim 2, wherein the replacing step includes replacing the failed signal processing circuit with another signal processing circuit which has not failed in response to the switching signal and a timing signal representing a relationship between the switching signal and the input signal.

4. A method according to claim 3, wherein the important information is system information and the less important information is communication information.

* * * * *